3,153,577
OZONE ANALYZER
Charles R. McCully, Prospect Heights, James N. Van Scoyoc, Oak Park, and Joseph F. Roesler, Chicago, Ill., assignors, by mesne assignments, to Mine Safety Appliances Company, Pittsburgh, Pa., a corporation of Pennsylvania
Filed Apr. 2, 1962, Ser. No. 184,247
6 Claims. (Cl. 23—255)

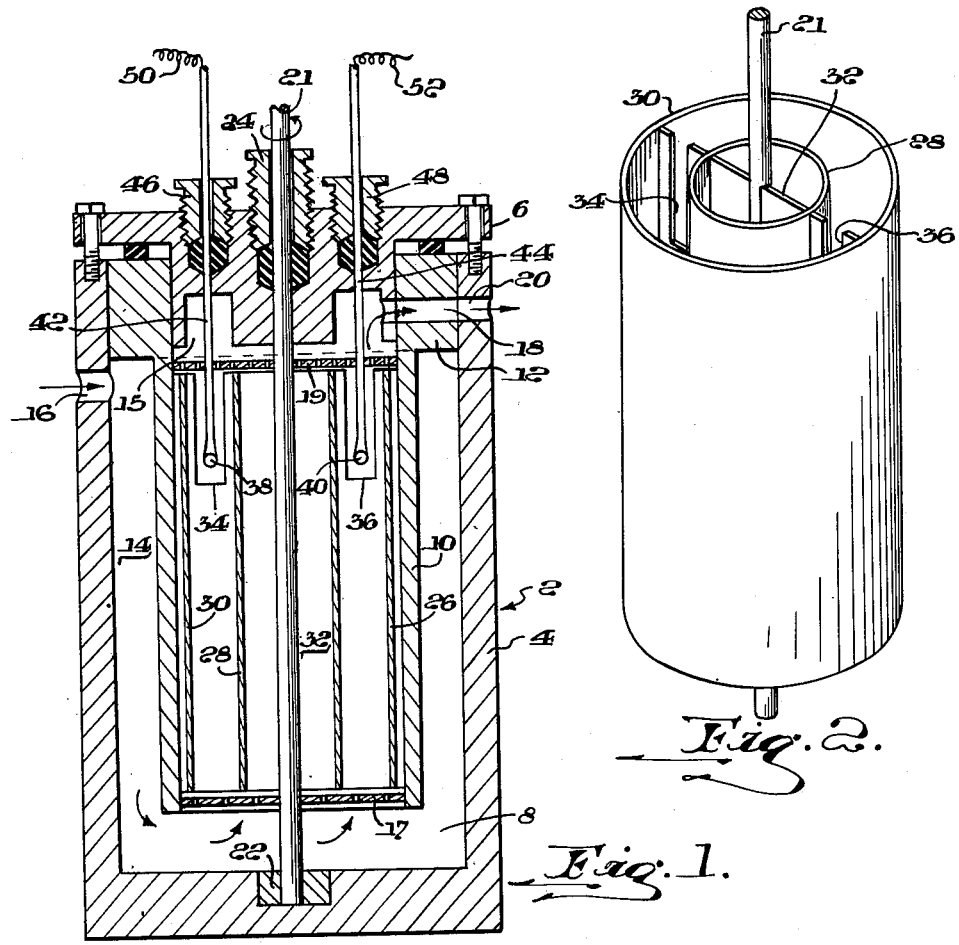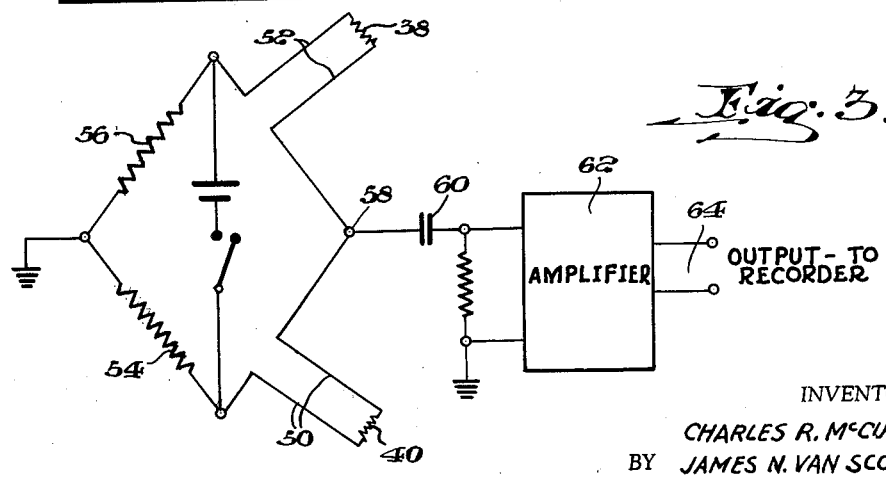
INVENTORS
CHARLES R. McCULLEY
JAMES N. VAN SCOYOC
JOSEPH F. ROESLER
BY Ronald H. Shakely
ATTORNEY United States Patent Office 3,153,577
Patented Oct. 20, 1964

This invention relates to an apparatus for the determination of ozone in the atmosphere, and more particularly to an apparatus for determining ozone by indirectly measuring heat released by its decomposition.

Olmer, U.S. Patent 2,899,281, determined ozone by passing a gas stream over two precisely matched thermistors which were included in a simple Wheatstone bridge circuit; one of the thermistors was coated with an ozone decomposition catalyst, the other was not coated. The exothermic decomposition of ozone heated the coated thermistor and the difference of resistance between the coated thermistor and the matched uncoated thermistor was measured by the bridge circuit to indicate ozone concentration. In this method it is necessary to maintain a very closely controlled temperature and rate of gas flow through the analyzer. Such precise control is difficult, requres auxiliary equipment and complicates the analyzer structure and operation; in some cases, such as sampling from moving aircraft at various altitudes, precise control of temperature and flow is for all practical purposes impossible.

It is a primary object of the invention to provide an apparatus for determining ozone that is relatively insensitive to change in ambient temperatures and pressures, and to sample flow rates through the apparatus. Another object is to provide an apparatus that is simple, compact and portable. Another object is to provide an apparatus for determining ozone that has a high precision under a wide variety of ambient conditions. Other objects will be apparent from the following description and claims.

According to our invention, the atmosphere sample is divided into two equal velocity streams, one of which is exposed to an ozone decomposition catalyst and warmed by the heat generated by the resulting ozone decomposition. A thermistor is cyclically contacted first with the unchanged stream and then with the stream warmed by the ozone decomposition, to cause a cyclical change in resistance of the thermistor. The thermistor is included as one arm of a D.C. bridge circuit, and the cyclical change of the thermistor resistance generates an output signal from the bridge having a cyclical variation of potential, the amplitude of which indicates the ozone concentration. Two thermistors are used in the preferred embodiment of this invention each one being included in a separate arm of the bridge circuit and each being alternately contacted with each portion of the sample stream, because of a larger signal for a given ozone concentration is obtained thereby. Any D.C. bridge imbalance or other spurious signals of different frequency than the ozone indicating signal, as may be caused by variations in ambient conditions, flow rates or irregularities in thermistors, are electrically filtered from the indicating signal.

Further details and advantages of our invention will be apparent from the description thereof in reference to the accompanying drawings, wherein:

FIG. 1 is a vertical section of a preferred analyzer cell;

FIG. 2 is a perspective view of the rotor of the analyzer cell shown in FIG. 1.

FIG. 3 is a schematic diagram of the electrical circuit used in conjunction with the analyzer cell shown in FIG. 1.

The analyzer cell 2 comprises a housing 4, having a removable top 6, forming a chamber 8. Tubular insert 10 is provided with an outwardly extending top flange 12 which is press-fit or otherwise sealed to the housing forming an outer annular passage 14 and inner passage 15, the housing is provided with an inlet opening 16 positioned below flnage 12, and an outlet opening 20 aligned with outlet conduit 18 in the flange 12. Gas distributors, such as screens, sintered metal or glass plates or the illustrated perforated plates 17 and 19 extend across passage 15.

Rotating shaft 21 is positioned on the axis of passage 15 by bearing 22 and packing gland 24. A rotor 26 of smaller diameter than passage 15 is supported within the passage and between the gas distributors 17 and 19 by shaft 21. The rotor consists of two concentric cylinders 28 and 30 bisected by partition 32, forming two semi-annular flow channels. Notches 34 and 36 in the top edge of partition 32 are equal distant from the axis. The inner surface of one of the semi-annular rotor channels is coated by any conventional method with a catalyst specific for accelerating the decomposition of ozone; suitable catalysts may comprise finely divided platinum black, or finely divided sintered complex oxides of magnesium, iron, nickel etc., one form of which is available as "Hopcalite" from Mine Safety Appliances Company.

Thermistors 38 and 40 are positioned by mounting tubes 42 and 44, held by packing glands 46 and 48, within the rotor and in alignment with notches 34 and 36. The thermistors are connected by leads 50 and 52, which pass through and are hermetically sealed with the mounting tubes, to the sensing and indicating circuit shown in FIG. 3.

In the operation of the analyzer, the atmosphere to be tested is pumped or drawn through the analyzer cell through inlet 16, downwardly through annular passage 14, upwardly through passage 15, and discharged through outlet opening 18 and 20. The ozone in that portion of the sample stream passing through the semi-annualar flow channel coated with catalyst decomposes exothermically, slightly warming that portion of the sample stream. On rotation of the rotor, one thermistor is exposed to air warmed by ozone decomposition while the other thermistor is exposed to unwarmed air, and this orientation is reversed at regular intervals.

Referring to FIG. 3 the two thermistors 38 and 40 are connected in two legs of a D.C. bridge circuit, the two other legs comprising fixed resistors 54 and 56. The alternate exposure of each thermistor to ambient air and air warmed by ozone decomposition causes a cyclic change in thermistor resistance; as a result, the potential of the signal output terminal 58 with respect to ground varies in phase with the rotation of the rotor.

The bridge output is connected to a means measuring the amplitude of the indicating signal through an electrical coupling means that will not pass D.C. current and will substantially eliminate or attenuate cyclical potential changes of different frequency than the indicating signal, such as capacitor 60 and resistance 61. The bridge output is an a.c. signal, which may be superimpressed on a D.C. signal due to bridge unbalance, and the bridge may thus be considered as A.C. signal generator.

The amplitude of the bridge circuit A.C. output signal is proportional to the ozone concentration and the signal is preferably amplified by a suitable amplifier 62, such as amplifier of the chopper-stabilization type, before it is measured. The amplified signal output 64 can be used in any conventional manner to indicate ozone concentration, as for example, by using a bridge circuit on the amplifier output to provide for zero center operation of standard recorders.

The housing and other parts of the anaylzer cell exposed to the test gas are formed from materials which are inert to ozone, suitably aluminum, plastics or glass. The housing, preferably of heavy gauge aluminum, protects the rotor and thermistors from outside thermal interference and random air fluctuations. A drive motor for shaft 21 can be conveniently mounted on the housing. The rotor elements are preferably of thin cross section, so that there is no substantial reduction of cross section of channel 15. The rotor elements, and especially partition 32, should have a relatively low thermal conductivity to minimize heat conductance between the flow channels. For example, suitable rotors have been made of aluminum foil, corrugated for strength, with a glass-reinforced Teflon partition, and of aluminum foil laminated with insulating material such as nylon net. Preferably, rotors are cast or otherwise formed in one piece from plastics or resins as, for example, epoxy resins.

Background noise is very low inasmuch as spurious noise signals of different frequency than the ozone indicating signal are electrically filtered out. Noise signals of identical frequency with the ozone indicating signal are small and negligible when using a symmetrical rotor, so that the analyzer can be used for the determination of very low concentrations of ozone, such as 0.1 p.p.m. ozone or less.

The sensitivity of the apparatus is surprisingly high, the signal being as high as one-half the maximum theoretical signal obtainable. The sensitivity remains constant over a wide change in flow rate of test gas through the instrument and of ozone concentration, so that the signal need not be corrected or adjusted for variations in these parameters under usual operating conditions. The analyzer can be operated for hours without temperature control and with no problems from drift or bridge imbalance.

To illustrate, the maximum possible temperature increases from the decomposition of ozone, calculated from the heat of decomposition of ozone (0.71 cal./g.) and the specific heat of air (0.24 cal./g.), is 0.003° C./p.p.m. of ozone. The maximum signal obtainable from two 30,000 ohm bead thermistors with a temperature coefficient of 3.9%/° C. is 88 $\mu$v./p.p.m. when they are incorporated in a bridge circuit of the two-active-arm type and the applied voltage to the bridge is 1.5 volts. Sensitivities of as high as 44 $\mu$v./p.p.m. of ozone were obtained using such a circuit with a detector cell in which the diameter of the passage 15 was 1.0 inch, and the cast epoxide resin rotor was 1.0 inch long and had an outer cylinder diameter of 0.75 inch and an inner cylinder diameter of 0.5 inch. The rotor was rotated at 4 r.p.m. dictating a 6.0 second time constant of the coupling circuit to pass the a.c. signal with minimum alteration. Samples of air containing 12.5 p.p.m. ozone and 20 p.p.m. ozone were passed through the analyzer at 2 to 3 liters per minute and the sensitivity remained constant at 44 $\mu$v./p.p.m. of ozone. At lower flow rates the sensitivity decreases, e.g. at 1.0 liters per minute by sensitivity was 9.0 $\mu$v./p.p.m. ozone. The minimum flow rate for constant sensitivity is readily determinable by usual calibration methods and is primarily dependent on the rotor geometry. The flow rate and cross section of the semi-annular flow channels are correlated so that turbulence in the air stream is continuous, to eliminate a discontinuous signal when the bisecting plane passes under the thermistors. The analyzer can, of course, be used outside the range of flow giving constant sensitivity, but it must then be calibrated for the particular flow rate used.

The analyzer is rugged and portable, and is reliable under adverse and difficult condition of use. For example, field tests were conducted in which the analyser was installed in an aircraft flying at altitudes ranging to 40,000 feet. Air was forced through the analyzer by pointing an inlet probe into the airstream and the outlet probe downstream. Under these adverse conditions, with variations in temperature, pressure, and flow rate through the cell, the background noise remained substantially constant, and ozone concentration as low as 0.2 p.p.m. were accurately determined.

The analyzer is upset by air of high himidity or air containing water droplets, such as cloud formations. Under such conditions, the sample stream is dried before it is introduced to the analyzer cell by chemical drying agents or by condensation of water vapor, as, for example, by passing the incoming air stream through a Dry Ice condenser.

Although the foregoing description has related primarily to an analyzer using two thermistors incorporated in a two-active-arm bridge it will be apparent that one thermistor in a one-active arm bridge may be used in the same manner.

According to the provisions of the patent statutes we have explained the principles of our invention and have illustrated and described what we now consider to represent its best embodiments. However, I desire to have it understood that within the scope of the appended claims, the invention may be practiced otherwise than as specifically described.

We claim:

1. An apparatus for determining ozone concentration in the atmosphere comprising a housing means forming a chamber;
   a first and second flow channel within the chamber, the first flow channel having associated therewith a catalyst specific for accelerating the decomposition of ozone;
   means providing a substantially equal velocity flow of test gas through the first and second flow channel;
   detector means including a thermistor in an arm of a D.C. bridge circuit;
   means to alternately contact the thermistor with the test gas effluent from each flow channel to generate an A.C. signal when ozone is present in the test gas, and means to measure the amplitude of the A.C. signal.

2. An apparatus according to claim 1 in which the detector means includes two thermistors in separate arms of a D.C. bridge circuit.

3. An apparatus for determining ozone concentration in the atmosphere comprising a housing means forming a chamber;
   a tubular rotor within the chamber, means to rotate the rotor lengthwise and having an axis of rotation inside the rotor, a partitioning means extending across the rotor and along the axis of rotation to provide a first and second flow channel within the rotor, the first flow channel having associated therewith a catalyst specific for accelerating the decomposition of ozone;
   means supporting a thermistor in a flow channel, means in the partitioning means to pass the thermistor therethrough upon rotation of the rotor;
   means to provide a flow of test gas through the rotor;
   an A.C. signal generator comprising a D.C. bridge circuit including the thermistor in an arm thereof, and means to measure the amplitude of the A.C. signal.

4. An apparatus for determining ozone concentration in the atmosphere comprising a housing means forming a chamber;
   a tubular rotor within the chamber, means to rotate the rotor lengthwise and having an axis of rotation inside the rotor, a partitioning means extending across the rotor and along the axis of rotation to provide a first and second flow channel within the rotor, the first flow channel having associated therewith a catalyst specific for accelerating the decomposition of ozone;
   means supporting a thermistor in each of the flow channels on a plane along and through the axis of rotation, means in the partitioning means to pass the thermistors therethrough upon rotation of the rotor;
   means to provide a flow of test gas through the rotor;
   an A.C. signal generator comprising a D.C. bridge circuit including each thermistor in a separate arm thereof, and means to measure the amplitude of the A.C. signal.

5. An apparatus for determining ozone concentration in the atmosphere comprising housing means forming a chamber;
a tubular insert extending into and spaced from the bottom and sides of the chamber, two perforated members extending across the insert and vertically spaced from each other;
means to provide a flow of test gas through the insert;
a rotor within the insert and between the two perforated members, the rotor comprising two concentric cylinders and a partitioning means bisecting the cylinders lengthwise to form a first and second semi-annular flow channel; the surface of the first flow channel being coated with a catalyst specific for accelerating the decomposition of ozone;
means to rotate said rotor on the lengthwise axis thereof;
means supporting a thermistor in each of the flow channels on a plane along and through the axis of rotation;
means in the partitioning means to pass the thermistor upon rotation of the rotor;
and an A.C. signal generator comprising a D.C. bridge circuit including each thermistor in a separate arm thereof, and means to measure the amplitude of the A.C. signal.

6. An apparatus for determining ozone concentration in the atmosphere comprising a housing forming a gas tight chamber comprising a tubular side wall, a bottom and a removable top, an inlet in the side wall of the housing, an outlet in the side wall of the housing and upwardly spaced from the inlet;
a tubular insert of smaller diameter than and spaced from the bottom of the housing having an outwardly extending top flange to provide a gas tight seal with the housing, the flange being positioned above the inlet opening and adjacent to the outlet opening and having a conduit therethrough in alignment with the outlet opening, two perforated members extending across and vertically spaced within the tubular insert;
a rotable shaft extending through and coincident with the axis of the tubular insert, a symmetrical rotor of smaller diameter than the tubular insert supported by the shaft between the perforated members, the rotor comprising two concentric cylinders bisected lengthwise by a partition to form first and second semi-annular flow channels, a notch in the top edge of the partition within each flow channel, the first flow channel being coated with a catalyst specific for accelerating the decomposition of ozones;
means in the housing top for supporting a thermistor within each flow channel on a line perpendicular to the shaft and in alignment with the partition notches;
means providing a flow of test gas through the chamber;
and an A.C. signal generator comprising a D.C. bridge circuit including each thermistor in a separate arm thereof, and means to measure the amplitude of the A.C. signal.

References Cited in the file of this patent

UNITED STATES PATENTS 2,899,281    Olmer _____ Aug. 11, 1959